(12) United States Patent
Furht et al.

(10) Patent No.: US 11,622,105 B2
(45) Date of Patent: Apr. 4, 2023

(54) ADAPTIVE BLOCK UPDATE OF UNAVAILABLE REFERENCE FRAMES USING EXPLICIT AND IMPLICIT SIGNALING

(71) Applicant: OP Solutions, LLC, Newton, MA (US)

(72) Inventors: Borivoje Furht, Boca Raton, FL (US); Hari Kalva, Boca Raton, FL (US); Velibor Adzic, Boca Raton, FL (US)

(73) Assignee: OP Solutions, LLC, Amherst, MA (US)

( * ) Notice: Subject to any disclaimer, the term of this patent is extended or adjusted under 35 U.S.C. 154(b) by 0 days.

(21) Appl. No.: 17/006,529

(22) Filed: Aug. 28, 2020

(65) Prior Publication Data

US 2020/0396449 A1    Dec. 17, 2020

Related U.S. Application Data

(63) Continuation of application No. PCT/US2019/063694, filed on Nov. 27, 2019.

(60) Provisional application No. 62/772,066, filed on Nov. 27, 2018, provisional application No. 62/771,941, filed on Nov. 27, 2018.

(51) Int. Cl.
*H04N 19/70* (2014.01)
*H04N 19/176* (2014.01)
*H04N 19/105* (2014.01)
*H04N 19/44* (2014.01)

(52) U.S. Cl.
CPC ......... *H04N 19/105* (2014.11); *H04N 19/176* (2014.11); *H04N 19/44* (2014.11); *H04N 19/70* (2014.11)

(58) Field of Classification Search
None
See application file for complete search history.

(56) References Cited

U.S. PATENT DOCUMENTS

| 9,661,325 | B1* | 5/2017 | Thompson | H04N 19/53 |
| 2008/0095245 | A1 | 4/2008 | Reznik | |
| 2011/0170593 | A1* | 7/2011 | Kim | H04N 19/96 |
| | | | | 375/240.12 |
| 2014/0050270 | A1 | 2/2014 | Lim et al. | |
| 2014/0072041 | A1* | 3/2014 | Seregin | H04N 19/176 |
| | | | | 375/240.13 |
| 2014/0192894 | A1 | 7/2014 | Deshpande | |
| 2014/0192897 | A1* | 7/2014 | Wang | H04N 19/31 |
| | | | | 375/240.25 |
| 2015/0063440 | A1 | 3/2015 | Pang et al. | |
| 2015/0146788 | A1* | 5/2015 | Han | H04N 19/52 |
| | | | | 375/240.16 |

(Continued)

OTHER PUBLICATIONS

PCT/US20/063694, International Search Report, dated Feb. 4, 2020.

(Continued)

*Primary Examiner* — Tsion B Owens
(74) *Attorney, Agent, or Firm* — OP Solutions IP Department; Paul Ackerman

(57) ABSTRACT

A decoder includes circuitry configured to receive a current block, determine the current block is a block for updating an unavailable reference frame based on the current block, and update the unavailable reference frame using the current block. Related apparatus, systems, techniques, and articles are also described.

3 Claims, 9 Drawing Sheets

(56) References Cited

U.S. PATENT DOCUMENTS

| | | | |
|---|---|---|---|
| 2015/0195555 A1* | 7/2015 | Hendry | H04N 19/70 375/240.16 |
| 2017/0064313 A1* | 3/2017 | Wu | H04N 19/70 |
| 2018/0160122 A1 | 6/2018 | Xu et al. | |
| 2018/0242024 A1* | 8/2018 | Chen | H04N 19/66 |
| 2019/0007698 A1* | 1/2019 | Tanner | H04N 19/164 |
| 2019/0289286 A1* | 9/2019 | Kitamura | H04N 19/159 |
| 2019/0373254 A1* | 12/2019 | Zhong | H04N 19/174 |

OTHER PUBLICATIONS

Sjoberg et al. "Overview of HEVC high-level syntax and reference picture management." In: IEEE Transactions on Circuits and Systems for Video Technology. Dec. 2012 (Dec. 2012) Retrieved on Jan. 18, 2020 (Jan. 18, 2020) from <https:1/www.researchgate.net/profile/Stephan_Wenger/publication/260665391_Overview_of_HEVC_High-Level_Syntax_and_Reference_Picture_Management/links/0f317 536287 4ecd641 0 00000/Overview-of-HEVC-High-Level-Syntax-and-Reference-Picture-Management.pdf> entire document.

Extended European search report dated Jan. 28, 2022, for corresponding EP application, EP 19890766.

"Description of SDR video coding technology proposal by DJI and Peking University", Wang et al, 10, JVET Meeting, Oct. 4, 2018-Apr. 20, 2018, San Diego, JVET-J0011-v3, Apr. 11, 2018.

"Report of 122nd Meeting", MPEG Meeting, Apr. 16, 2018-Apr. 20, 2018; San Diego, ISO/IEX JTC1/SC29/WG11, dated Jul. 18, 2018.

"High Efficiency Video Coding (HEVC) text specification draft 10 (for FDIS & consent)", Brass et al., JCT-VC Meeting, JCTVC-L1003 Mar. 16, 2014.

"Overview of HEVC high-level syntax and reference picture management", IEEE Transactions on Circuits and Systems for Video Technology, vol. 22, No. 12, Oct. 5, 2012.

* cited by examiner

ADAPTIVE BLOCK UPDATE OF UNAVAILABLE REFERENCE FRAMES USING EXPLICIT AND IMPLICIT SIGNALING

CROSS-REFERENCE TO RELATED APPLICATIONS

This application claims the benefit of priority of International Application No. PCT/US19/63694, filed on Nov. 27, 2019 and entitled "ADAPTIVE BLOCK UPDATE OF UNAVAILABLE REFERENCE FRAMES USING EXPLICIT AND IMPLICIT SIGNALING," which claims the benefit of priority of U.S. Provisional Patent Application Ser. No. 62/772,066, filed on Nov. 27, 2018, and titled "ADAPTIVE BLOCK UPDATE OF LONG TERM REFERENCE FRAMES USING EXPLICIT SIGNALING" and U.S. Provisional Patent Application Ser. No. 62/771,941, filed on Nov. 27, 2018, and titled "ADAPTIVE BLOCK UPDATE OF LONG TERM REFERENCE FRAMES USING IMPLICIT SIGNALING." Each of International Application No. PCT/US19/63694, U.S. Provisional Patent Application Ser. No. 62/772,066, and U.S. Provisional Patent Application Ser. No. 62/771,941 is incorporated by reference herein in its entirety.

FIELD OF THE INVENTION

The present invention generally relates to the field of video compression. In particular, the present invention is directed to an adaptive block update for an unavailable reference picture.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)-2 (also referred to as advanced video coding (AVC) and H.264) standard. Motion compensation can describe a picture in terms of the transformation of a reference picture to the current picture. The reference picture can be previous in time when compared to the current picture, from the future when compared to the current picture, or can include a long-term reference (LTR) frame. When images can be accurately synthesized from previously transmitted and/or stored images, compression efficiency can be improved.

Current standards such as H.264 and H.265 allow updating of frames such as long-term reference frames by signaling a newly decoded frame to be saved and made available as a reference frame. Such updates are signaled by the encoder and an entire frame is updated. But updating the entire frame can be costly, particularly where only a small portion of the static background has changed. Partial frame updates are possible but can often involve complex and computationally costly procedures to effect the frame updates.

SUMMARY OF THE DISCLOSURE

In an aspect, a decoder includes circuitry configured to receive a bitstream including a current coded block, determine a decoded current block, determine that an unavailable reference block update mode is enabled in the bitstream for the current coded block, and update an unavailable reference frame using the decoded current block.

In another aspect, a method includes receiving, by a decoder, a bitstream including a current coded block. The method includes determining a decoded current block. The method includes determining that an unavailable reference block update mode is enabled in the bitstream for the current coded block. The method includes updating an unavailable reference frame using the decoded current block.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4 is a block diagram illustrating another example frame that includes blocks that do not use the UR frame for reference and blocks that use the UR frame for reference;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Some implementations of the current subject matter include approaches to perform partial updates to an unavailable reference (UR) frame on the decoder side. An unavailable reference (UR) frame is a frame and/or picture used to create predicted frames and/or pictures in one or more groups of pictures (GOP), but which is not itself displayed in a video picture. A frame marked as a UR frame in a video bitstream may be available for use as a reference until it is explicitly removed by bitstream signaling. UR frames may improve prediction and compression efficiency in scenes that have static background over an extended period (e.g., background in a video conference or video of parking lot surveillance). However, overtime, the background of a scene gradually changes (e.g., cars when parked in an empty spot become part of the background scene). Partial UR frame updates may be explicitly signaled in the bitstream by utilizing an unavailable reference block update mode that, when enabled for a given current block, may indicate that a decoded current block be used to update spatially co-located pixels within a UR frame. Such partial UR frame updates may improve prediction without requiring an entire UR frame update, which may reduce residual error and therefore improve compression performance. Moreover, by explicitly signaling UR block updates, UR updates may be achieved simply and without utilizing inadequate and complex procedures.

Alternatively or additionally, partial UR frame updates may be implicitly signaled so that no explicit signaling, or reduced explicit signaling, in a bitstream is required as compared to some alternative approaches. An implicit signal approach may indicate that a decoded current block be used to update spatially co-located pixels within a UR frame. Such partial UR frame updates may improve prediction without requiring an entire UR frame update, which can reduce residual error and therefore improve compression performance. Moreover, by implicitly signaling UR block updates, header overhead can be reduced, thereby reducing the bit rate, and improving compression. Further, in some implementations, UR updates can be achieved simply and without utilizing inadequate and complex procedures.

Figure 1:
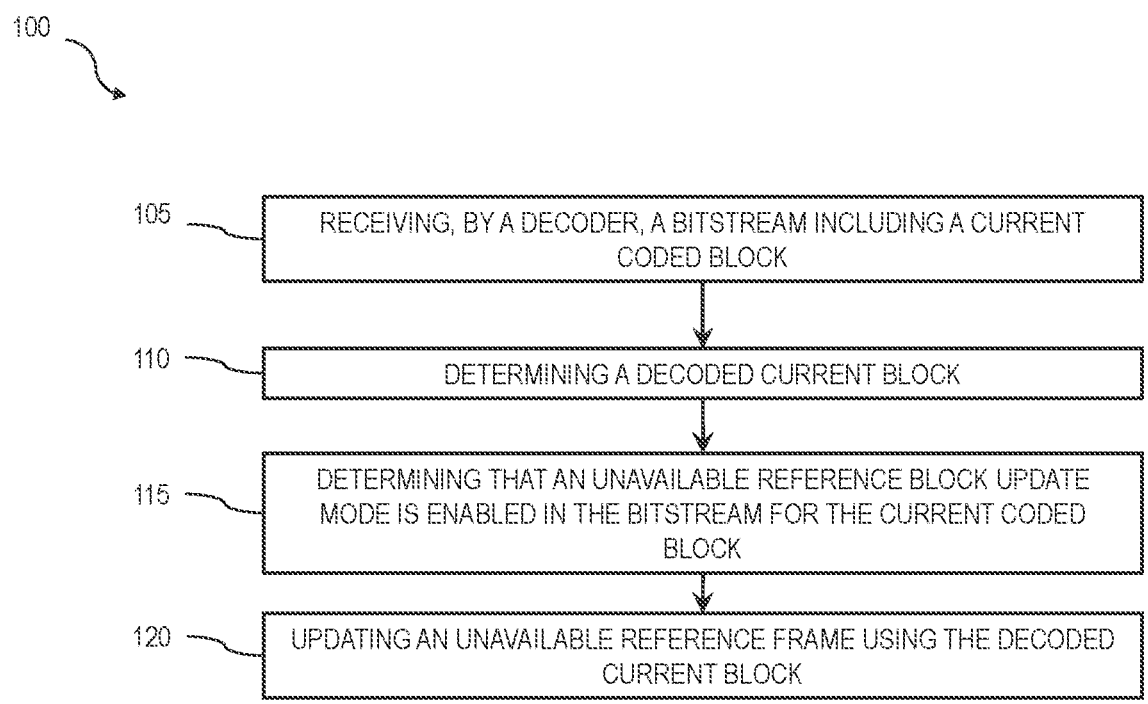
FIG. 1 is a process flow diagram illustrating an example process of an unavailable reference (UR) frame block updates in which a UR frame is partially updated by the decoder and based on a decoded current block.

In some implementations, implicit signaling of video blocks identifies cases where current and neighboring block context is used to implicitly determine which blocks are updated in a UR frame (e.g., which portions of the UR frame should be updated). Referring now to FIG. 1 a process flow diagram is provided illustrating an example process 100 of UR frame block updates using explicit signaling in which a UR frame is partially updated by the decoder and based on a decoded current block. Such UR block updates may improve prediction without requiring an entire UR frame update, which may reduce residual error and therefore improve compression performance.

At step 105, and still referring to FIG. 1, a bitstream including a current coded block is received by a decoder. Bitstream may include, for example, data found in a stream of bits that is an input to a decoder when using data compression. Bitstream may include information necessary to decode a video. Receiving can include extracting and/or parsing the block and associated signaling information from the bit stream. In some implementations, the current coded block may include a coding tree unit (CTU), a coding unit (CU), or a prediction unit (PU).

At step 110, and continuing to refer to FIG. 1, a decoded current block may be determined. For example, a received current coded block may be decoded, for example, by using inter prediction. Decoding via inter prediction may include using a previous frame, a future frame, or a UR frame as a reference for computing a prediction, which may be combined with a residual contained in bitstream.

At step 115, and with continued reference to FIG. 1, whether an unavailable reference block update mode is enabled in bitstream for current coded block may be determined. UR block update mode may be included in a header of bitstream and/or a field included therein. For example, it may be determined that a UR block update mode field in a header of bitstream is enabled. Signaling of UR frame block updated may be enabled selectively using a header such as a picture parameter set (PPS) and/or sequence parameter set (SPS). A field, such as UR BLOCK UPDATE may take on, without limitation, values of true or false (e.g., 0 or 1).

Still referring to FIG. 1, if a UR block update mode is enabled (e.g., if a UR BLOCK UPDATE field in header is set), at 120, decoder may update an unavailable reference frame using decoded current block. Such updating may include performing UR block updates in which pixels in UR frame that are spatially co-located with a current block for which UR frame block update mode is enabled are updated (e.g., modified) using the decoded current block. In some implementations, block update mechanisms may be explicit or implicit. For example, a portion of (e.g., a block of) UR frame can be updated by updating co-located pixels (e.g., luma values) in UR frame with pixel values of decoded current block; in other words, updating UR frame may include replacing luma values of the UR frame with spatially co-located luma values of the decoded current block. In some implementations, UR frame may be updated according to another mechanism, such as updating a portion of the UR frame with an average of initial co-located UR frame pixel values and current decoded block pixel values. Persons skilled in the art, upon reviewing the entirety of this disclosure, will be aware various other mechanisms that may be employed. In some implementations, updating may include updating a plurality of blocks of UR frame with a plurality of decoded blocks, which may be performed using any methods described above for updating UR frame with decoded current block. Updating may include, without limitation, generation of a block and/or frame of default chroma and/or luma values and replacement and/or updating thereof from one or more decoded blocks using any process and/or process steps described above; updating may include generating the UR frame, which may be accomplished by creating a UR frame of default values and updating the default values as described above.

With continued reference to FIG. 1, for subsequent current blocks, an updated UR frame may be utilized as a reference frame for inter prediction. For example, a second coded block may be received. Whether an inter prediction mode is enabled for a second coded block may be determined. A second decoded block may be determined using an updated UR frame as a reference frame and according to inter prediction mode. For example, decoding via inter prediction may include using updated UR frame as a reference for computing a prediction, which may be combined with a residual contained in the bitstream.

Still referring to FIG. 1, UR block updates may be available for each current block during decoding process. In some implementations, UR block updates may be implicitly skipped for intra coded frames. For example, bitstream may include a second current coded block within a different frame than first current coded block; a mode of the second current coded block may include intra prediction. A UR block update may be skipped in response to determining that second current coded block is an intra prediction block. Skipping may include, e.g., not updating a UR frame or determining whether a field such as UR BLOCK UPDATE is set in the header.

In some implementations, and further referring to FIG. 1, if a UR BLOCK UPDATE field in header is set, decoder may expect explicit block update signaling bits in bitstream. In this approach, a coded block of video may be signaled in a block header of a video bitstream as a block to be updated in a UR frame. In that case, a co-located block in UR frame may be replaced by a signaled block; this updated UR frame may be used for future motion estimation purposes until the UR frame is subsequently updated, for example.

Figure 2:
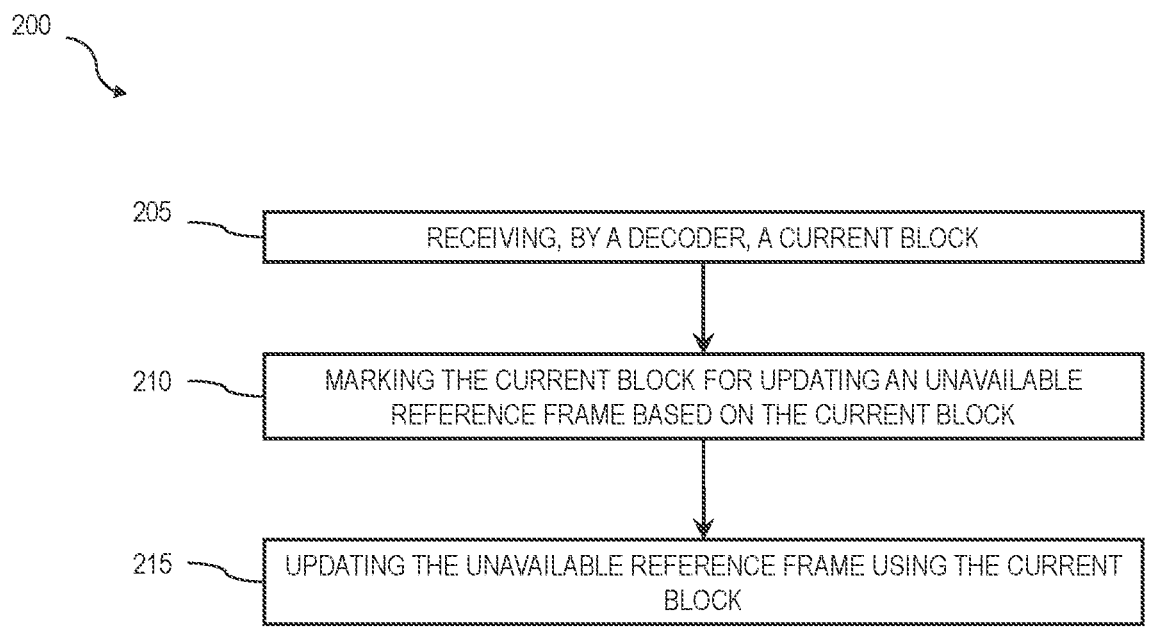
FIG. 2 is a process flow diagram illustrating an example process of UR frame block updates using implicit signaling in which a UR frame is partially updated by the decoder and based on a decoded current block.

FIG. 2 is a process flow diagram illustrating an exemplary embodiment of a process 200 of UR frame block updates using implicit signaling in which a UR frame is partially updated by a decoder and based on a decoded current block. Implicit signaling may include cases where current and neighboring block context is used to determine which blocks of a UR frame should be updated as compared to explicitly signaling a UR block update mode in the bitstream, such as in a header of a bitstream. Such UR block updates with implicit signaling may improve prediction and reduce signaling overhead, thereby improving bit rate and improving compression. Similarly, by performing UR block updates without requiring an entire UR frame update, some implementations can reduce residual error and therefore improve compression performance.

At step 205, and still referring to FIG. 2, a current block is received by a decoder. Current block may be contained within a bitstream that decoder receives. Bitstream may include, for example, data found in a stream of bits that is an input to a decoder when using data compression. Bitstream may include information necessary to decode a video. Receiving may include extracting and/or parsing a block and associated signaling information from bit stream. In some implementations, a current block may include a coding tree unit (CTU), a coding unit (CU), and/or a prediction unit (PU).

With continued reference to FIG. 2, in some implementations, and still referring to FIG. 2, an unavailable reference block update mode may not be explicitly signaled in the bitstream for the current block. Similarly, in some implementations, a decoder may determine, using the bitstream, whether an unavailable reference block update mode is or is not explicitly signaled in the bitstream for a current block. In some implementations, decoder may determine that a field in a header of bitstream indicates that an unavailable reference block update mode is disabled or absent.

At step 220, and continuing to refer to FIG. 2, a current block may be marked for updating a UR frame based on the current block; the current block may be marked based on or in response to determining that the current block is implicitly signaled for use in a UR frame block update. Marking may include, without limitation, setting a variable value to a value indicating that the current block is to be used for updating a UR frame; for instance, a Boolean variable associated with current block and configured to indicate whether current block is to be used for updating a UR frame may be set to "true" or "1" to indicate marking.

For example, and still referring to FIG. 2, a current block may be marked for updating when the current block uses UR frame as a reference for inter prediction and includes applying illumination compensation; marking may be performed in response to and/or based on this determination. Illumination compensation may be used to improve prediction in video coding. Illumination compensation may improve prediction in cases where block pixels change because of illumination (e.g., cloud passing by reduces illumination). A block that uses UR frame as a reference and applies illumination compensation may be determined as an update block and marked accordingly for updating the UR frame.

As another example, and with continued reference to FIG. 2, a current block may be marked for updating a UR frame when and based on which block neighbors utilize a UR motion vector reference. In a representative (e.g., typical) video, a portion of a scene background updates over time. When such changes occur, a changed area may be coded as intra block when no similar block is found. In such cases all blocks except the newly changed region are likely to use UR frame for reference. A block that has multiple neighboring blocks with UR motion vector reference may be marked for implicit UR frame update. Accordingly, the likelihood of a current block being a UR update block is higher as neighboring blocks of the current block that use UR frame increases; the likelihood may be computed and compared to a threshold number, where likelihood exceeding the threshold number may indicate the current block is a UR update block. If current block is intra coded a smaller number of neighboring blocks with UR reference may signal UR block update; for instance, a lower threshold number may be employed in a threshold comparison as above. If current block is inter coded, a higher number of neighboring blocks with UR reference may implicitly signal UR block update, for instance by using a higher threshold number. Accordingly, as another non-limiting example, a current block may be marked for updating a UR frame in response to and/or based on determining that two or more neighboring blocks to the current block use a UR motion vector for inter prediction.

Still referring to FIG. 2, in some implementations block update candidates may be determined after an entire frame has been decoded so that an entire block neighborhood may be considered. For example, a block with non-UR reference surrounded by blocks with UR references on two or more sides may be candidate for UR updates. As another example, if a current block is intra coded and a plurality of neighboring blocks use UR frame as reference and have a motion vector of (0,0) (e.g., a zero motion vector), then the current block may be marked for UR update. As yet another example, if a current block is intra coded and a plurality of neighboring blocks use UR frame as reference and have the same or a similar motion vector (e.g., the motion vector can differed by less than a predetermined or a predefined amount), then the current block may be marked for UR update. As a further example, if a current block has neighboring blocks on at least three sides of the current block that use UR frame as a reference for inter prediction, current block may be marked for UR update.

Figure 3:
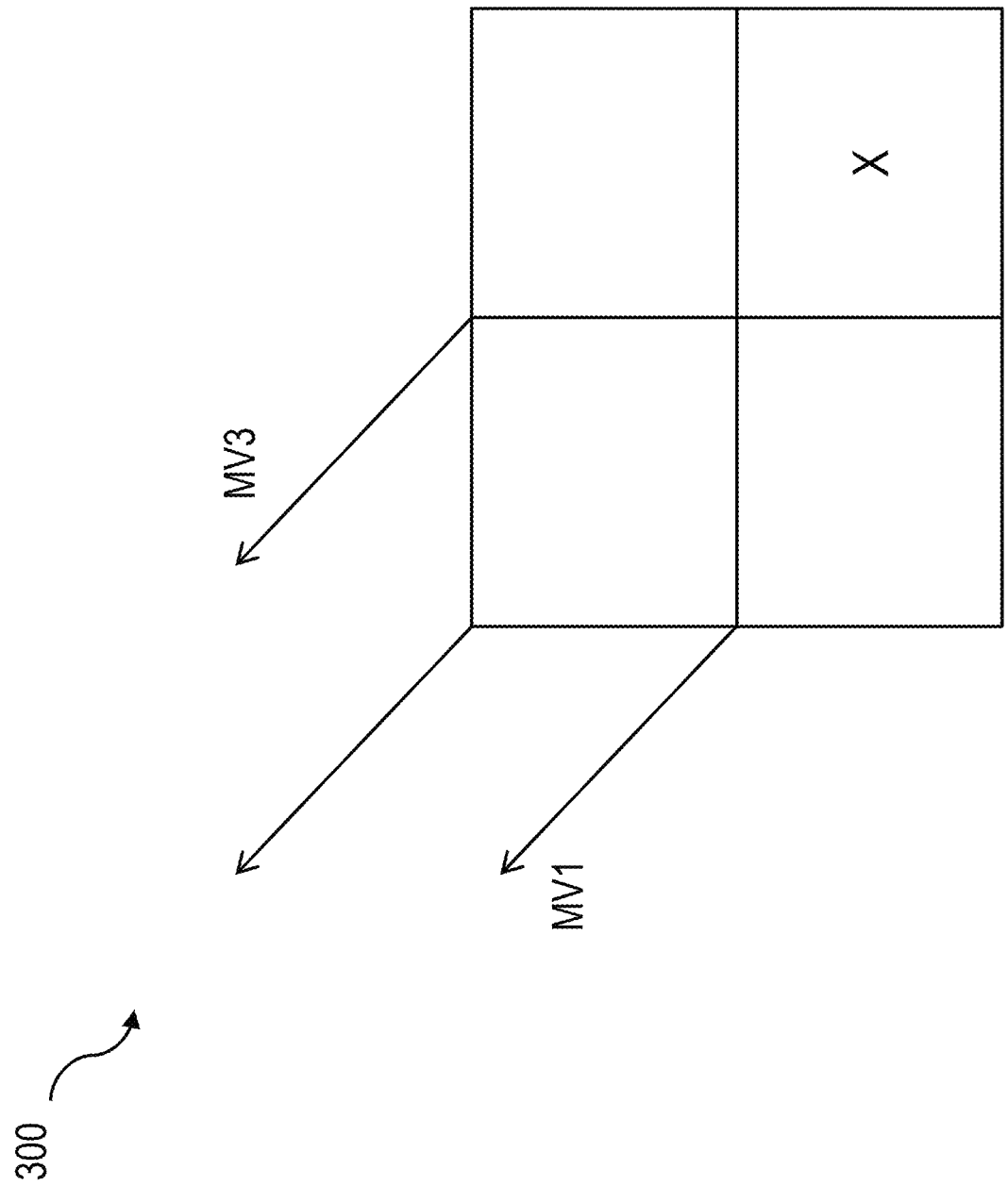
FIG. 3 is a block diagram illustrating an example frame including a current block X and three neighboring blocks having associated motion vectors that use a UR frame for motion estimation.

In some implementations, and continuing to refer to FIG. 2, UR update may also be determined at coding unit (CU) level. If neighboring CUs on at least three sides all use UR reference, all blocks of the current CU may be marked for UR update. In some implementations, UR update may be determined at coding tree unit (CTU) level. If neighboring CTUs on at least three sides all use UR reference, all blocks of a current CTU that do not use UR reference may be marked for update. FIG. 3 is a block diagram illustrating an exemplary embodiment of a frame 300 including a current block X and three neighboring blocks having associated motion vectors MV1, MV2, MV3 that use a UR frame for motion estimation. In the illustrated example, current block X may be marked for updating the UR frame.

Figure 4:
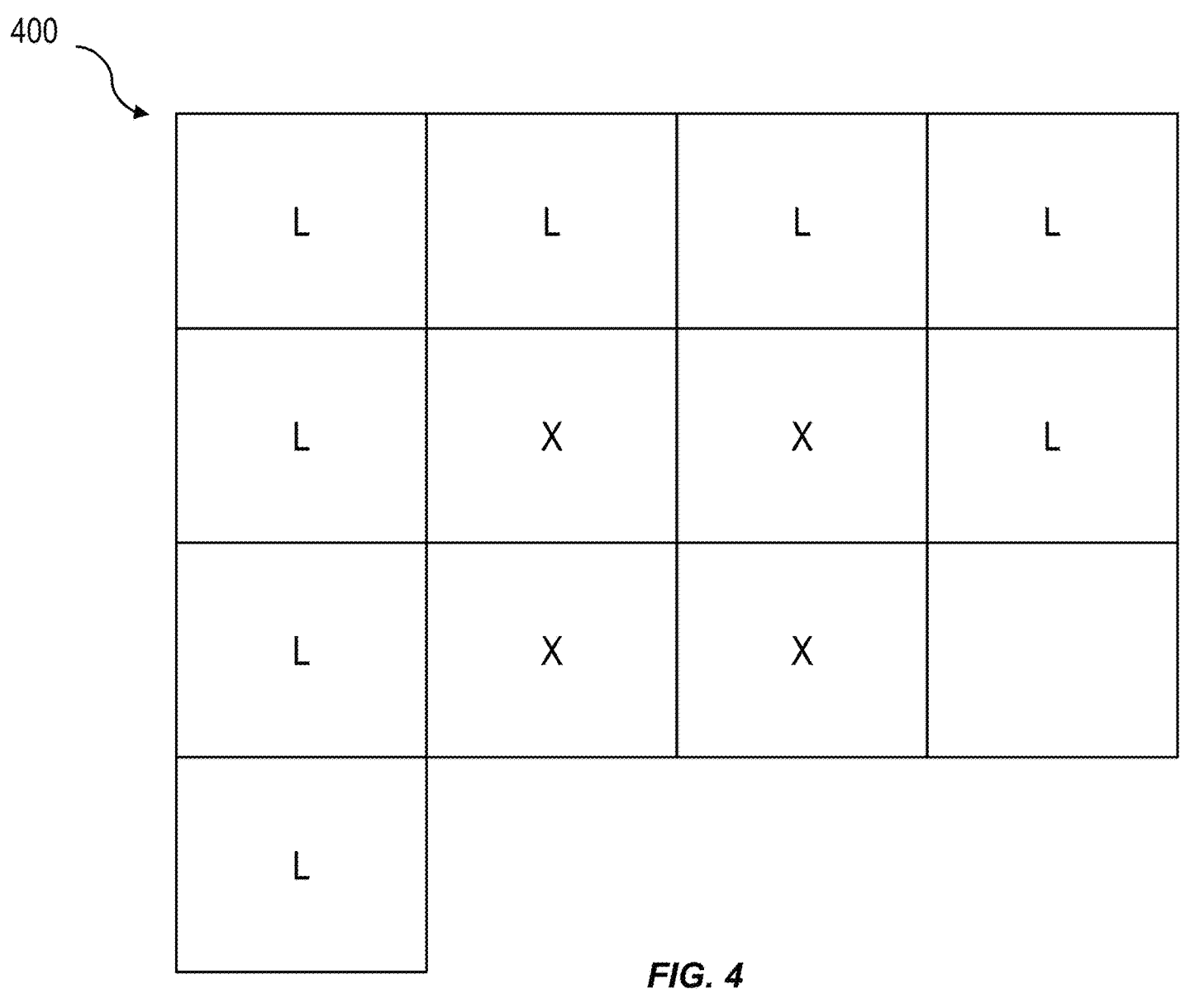

FIG. 4 is a block diagram illustrating another exemplary embodiment of a frame 400 that includes blocks labeled X, which do not use the UR frame for reference and blocks L that use the UR frame for reference; the blocks marked as X may be marked for updating the UR frame.

Referring again to FIG. 2, at step 215, UR frame may be updated using current block. Updating may include performing UR block updates in which pixels in UR frame that are spatially co-located with current block are updated (e.g., modified) using the current block. In some implementations, block update mechanisms may be explicit or implicit. For example, a portion of (e.g., a block of) a UR frame may be updated by updating (e.g., replacing) co-located pixels (e.g., luma values) in the UR frame with the pixel values of current block. In some implementations, UR frame may be updated according to another mechanism, such as updating a portion of the UR frame with an average of initial co-located UR frame pixel values and current block pixel values. Persons skilled in the art, upon reviewing the entirety of this disclosure, will be aware various other mechanisms that may be employed. In some implementations, updating may include updating a plurality of blocks of UR frame with a plurality of decoded blocks, which may be performed using any methods described above for updating UR frame with decoded current block. Updating may include, without limitation, generation of a block and/or frame of default chroma and/or luma values and replacement and/or updating thereof from one or more decoded blocks using any process and/or process steps described above; updating may include generating the UR frame, which may be accomplished by creating a UR frame of default values and updating the default values as described above.

For subsequent current blocks, updated UR frame may be utilized as a reference frame for inter prediction. For example, a second coded block may be received. Whether an inter prediction mode is enabled for second coded block may be determined. A second decoded block may be determined using updated UR frame as a reference frame and according to an inter prediction mode. For example, decoding via inter prediction may include using updated UR frame as a reference for computing a prediction, which may be combined with a residual contained in bitstream.

Figure 5:
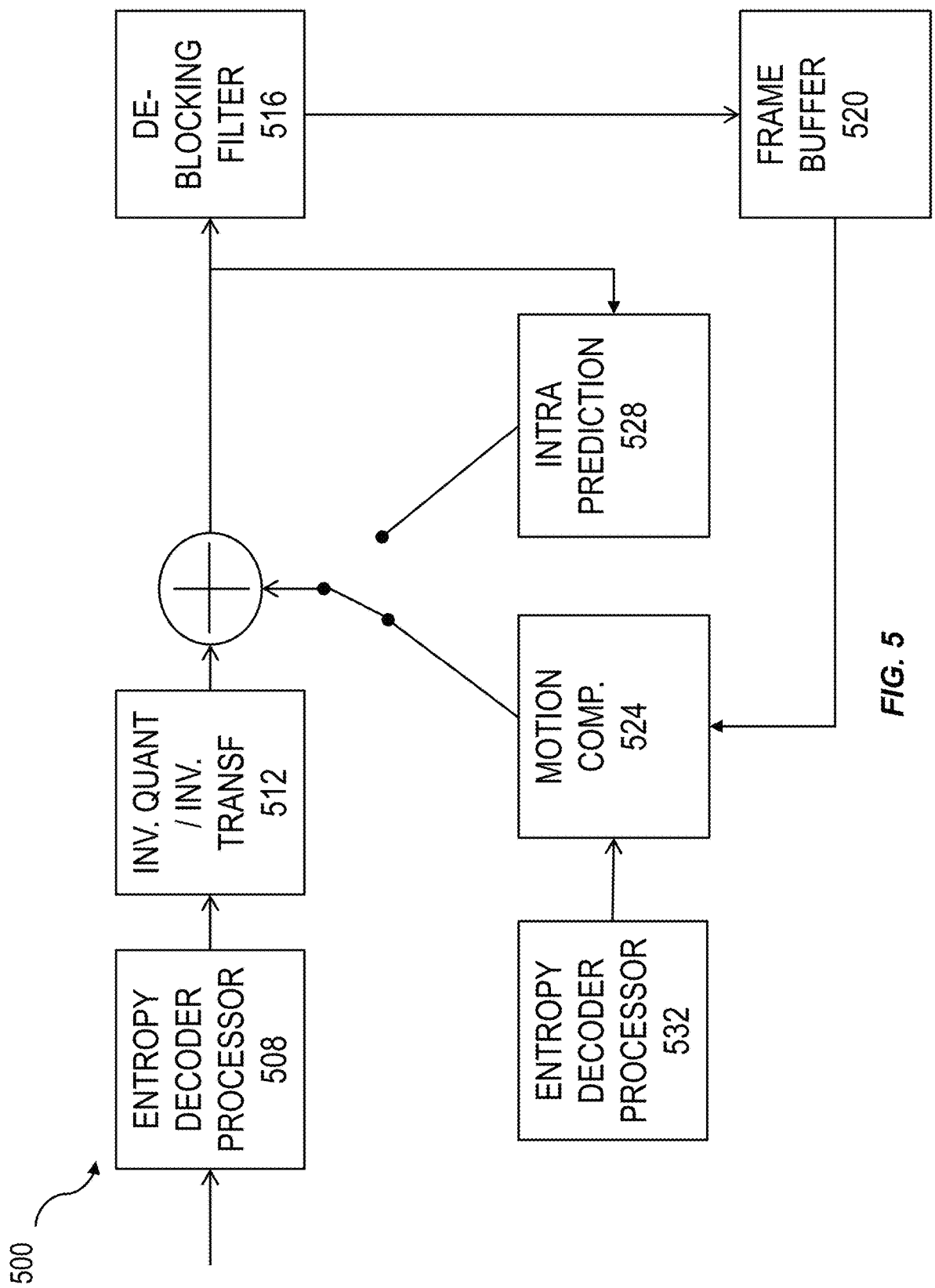
FIG. 5 is a system block diagram illustrating an example decoder capable of decoding a bitstream with UR frame block updating.

FIG. 5 is a system block diagram illustrating an example decoder 500 capable of decoding a bitstream 504 with UR frame block updates. UR frame block updates may include without limitation explicitly signaled UR frame block updates, for instance and without limitation as described above in reference to FIG. 1. UR frame block updates may include without limitation UR frame block updates that are implicitly signaled (e.g., UR frame block updates determined from a context of the current and/or neighboring blocks), for instance as described above in reference to FIGS. 2-4. Decoder 500 includes an entropy decoder processor 508, an inverse quantization and inverse transformation processor 512, a deblocking filter 516, a frame buffer 520, motion compensation processor 524 and intra prediction processor 528. In some implementations, the bitstream 504 may include parameters (e.g., field in a header of the bitstream) that signal a UR frame block update mode. Alternatively or additionally, bitstream 504 may not explicitly signal a UR frame block update mode for the current block; bitstream may contain other parameters. Motion compensation processor 524 may reconstruct pixel information using UR frame and update the UR frame according to the UR frame block update mode. For example, when UR frame block update mode is explicitly signaled for a current block, co-located pixels (e.g., luma values) in UR frame may be replaced with pixel values of the current block. Where block update is implicitly signaled, motion compensation processor 524 may mark a current block for updating UR frame (e.g., based on whether a UR frame update is implicitly signaled), and update the UR frame accordingly. For example, when UR frame block update is implicitly signaled for a current block, co-located pixels (e.g., luma values) in the UR frame may be replaced with pixel values of the current block.

In operation, bit stream 504 may be received by decoder 500 and input to entropy decoder processor 508, which may entropy decode the bit stream into quantized coefficients. Quantized coefficients may be provided to inverse quantization and inverse transformation processor 512, which may perform inverse quantization and inverse transformation to create a residual signal, which may be added to an output of motion compensation processor 524 or intra prediction processor 528 according to processing mode. Output of motion compensation processor 524 and intra prediction processor 528 may include a block prediction based on a previously decoded block or UR frame. A sum of prediction and residual may be processed by deblocking filter 516 and stored in a frame buffer 520. For a given block, (e.g., CU or PU), when bit stream 504 explicitly and/or implicitly signals that UR frame block update mode is enabled, motion compensation processor 524 may update UR frame, which may be included in frame buffer 520, to update co-located pixels (e.g., luma values) in UR frame with pixel values of a current block.

In some implementations, a decoder 500 may include a UR frame block update processor 532 that may generate a UR frame update based on the current block and provide UR frame pixel values for inter prediction processes; this may be implemented according to any process steps described in this disclosure. UR frame block update processor 532 may directly influence motion compensation. Further, the UR frame update processor 532 may receive information from intra-prediction processor 528, such as when a current block is an intra prediction block.

Figure 6:
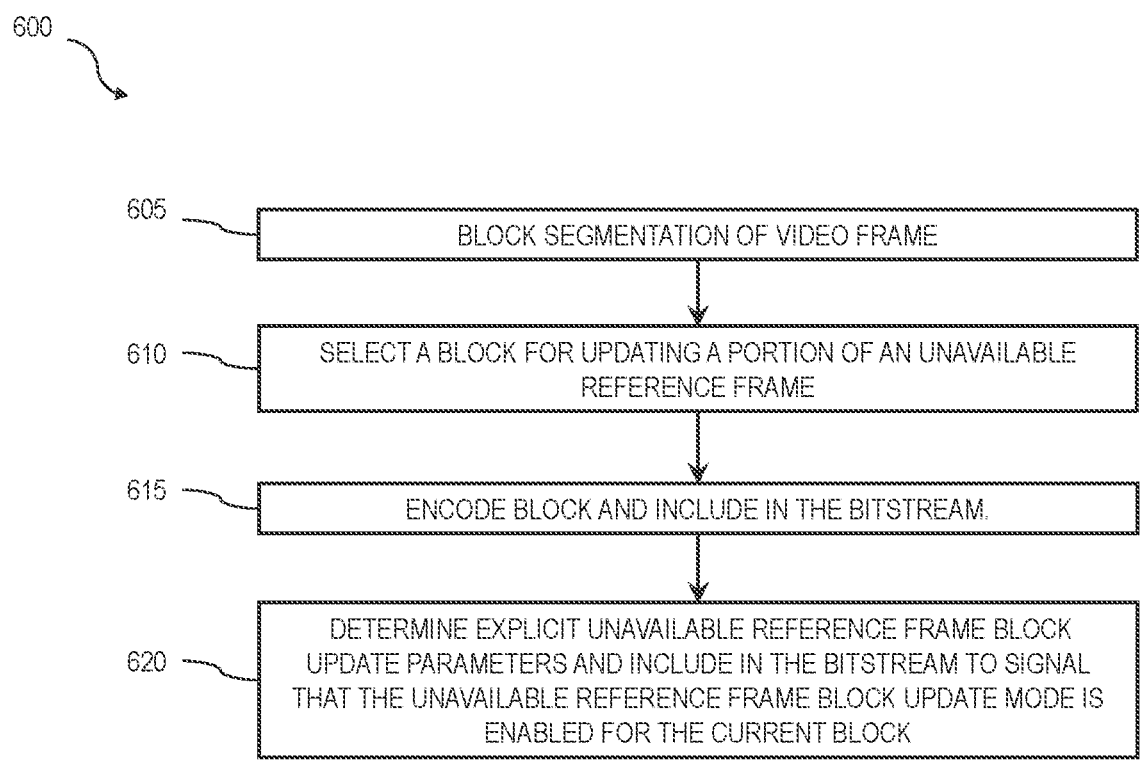
FIG. 6 is a process flow diagram illustrating an example process of encoding a video with UR frame block updates according to some aspects of the current subject matter.

FIG. 6 is a process flow diagram illustrating an exemplary embodiment of a process 600 of encoding a video with UR frame block updates with explicit signaling according to some aspects of current subject matter that may reduce encoding complexity while increasing compression efficiency. At step 605, a video frame may undergo initial block segmentation, for example, using a tree-structured macro block partitioning scheme that can include partitioning a picture frame into CTUs and CUs. At step 610, a block may be selected for updating a portion of the UR frame. The block may be selected, for example, based on a frequency content and/or measure of motion within the block as compared to one or more co-located blocks that are temporally proximal (e.g., temporally adjacent frames, such as within a predetermined number of frames of the current frame). Determination of a measure of frequency content may include determination using a transform matrix, such without limitation a discrete cosine transformation matrix. Determining a measure of frequency content for a block may include determination using a generalized discrete cosine transformation matrix. For example, where blocks as described above are 4×4 blocks of pixels, a generalized discrete cosine transform matrix may include a generalized discrete cosine transform II matrix taking the form of:

$$T = \begin{pmatrix} a & a & a & a \\ b & c & -c & -b \\ a & -a & -a & a \\ c & -b & b & -c \end{pmatrix}$$

where $a$ is $\frac{1}{2}$, $b$ is $\sqrt{\frac{1}{2}}\cos\frac{\pi}{8}$, and $c$ is $\sqrt{\frac{1}{2}}\cos\frac{3\pi}{8}$.

In some implementations, an integer approximation of a transform matrix may be utilized, which may be used for efficient hardware and software implementations. For example, where blocks as described above are 4×4 blocks of pixels, a generalized discrete cosine transform matrix may include a generalized discrete cosine transform II matrix taking the form of:

$$T_{INT} = \begin{pmatrix} 1 & 1 & 1 & 1 \\ 2 & 1 & -1 & -2 \\ 1 & -1 & -1 & 1 \\ 1 & -2 & 2 & -1 \end{pmatrix}.$$

For a block $B_i$, a frequency content of the block may be calculated using:

$F_{Bi} = T \times B_i \times T'.$ where T' is a transpose of a cosine transfer matrix T, $B_i$ is a block represented as a matrix of numerical values corresponding to pixels in the block, such as a 4×4 matrix representing a 4×4 block as described above, and the operation x denotes matrix multiplication. The selection may include identifying according to a metric rule that a block is to be used for updating a portion of the UR frame at the decoder. Metric rule may include a comparison of a measure of texture and/or motion, including without limitation any measure of frequency content or the like described above, to a predetermined and/or stored threshold. As a non-limiting example, where FBi as defined above exceeds some value, an update may be triggered, for instance because a very high frequency may not be perceptible. Selection may alternatively or additionally be performed using any process and/or process step described below in reference to FIG. 7. At step 615, block may be encoded and included in bitstream.

At step 620, explicit UR frame block update parameters may be determined and included in the bitstream to signal that UR frame block update mode is enabled for the current block. For example, a field in the PPS or SPS may be set (e.g., enabled). For example, a field such as a UR BLOCK UPDATE field may be set indicating for the current block that UR frame block update mode is enabled.

Figure 7:
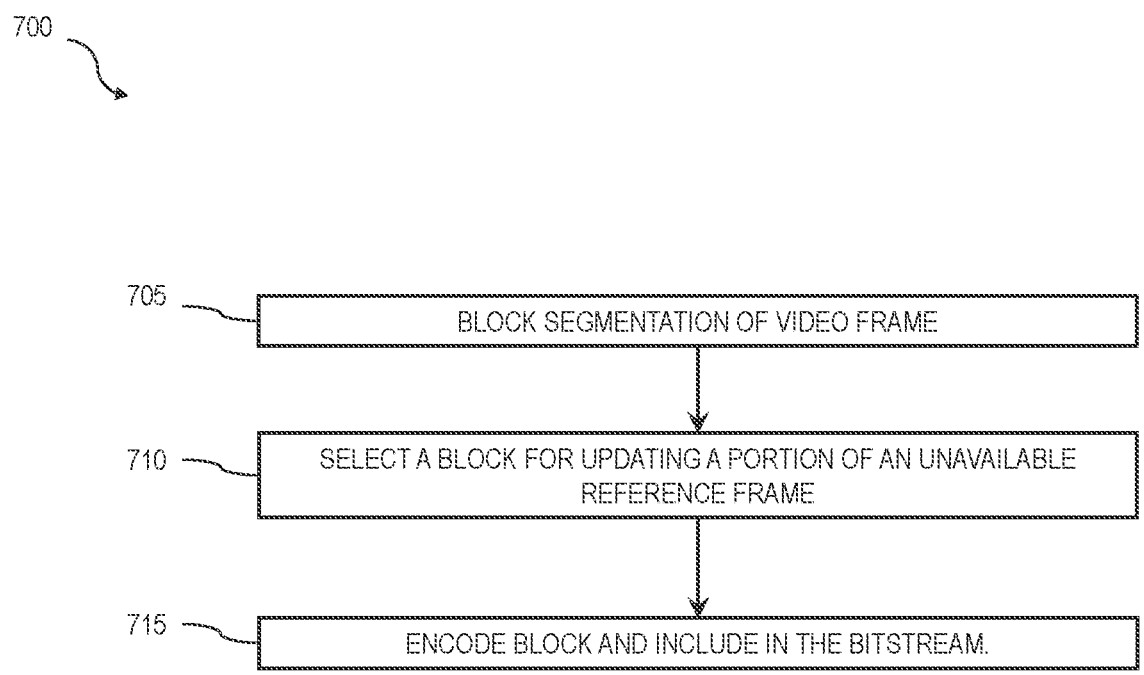
FIG. 7 is a process flow diagram illustrating an example process of encoding a video with UR frame block updates according to some aspects of the current subject matter that can reduce encoding complexity while increasing compression efficiency.

FIG. 7 is a process flow diagram illustrating an exemplary embodiment of a process 700 of encoding a video with UR frame block updates with implicit signaling according to some aspects of the current subject matter that may reduce encoding complexity while increasing compression efficiency. At step 705, a video frame may undergo initial block segmentation, for example, using a tree-structured macro block partitioning scheme that may include partitioning a picture frame into CTUs and CUs.

At step 710, and still referring to FIG. 7, a block may be selected for updating a portion of UR frame; the block may be selected, for example, based on an implicit UR frame update condition. The selection can include identifying according to a condition that a block is to be used for updating a portion of UR frame at the decoder. These conditions may include, for example, when a current block uses a UR frame as a reference for inter prediction and includes applying illumination compensation. As another example, conditions may relate to which block neighbors utilize a UR motion vector reference, such as when a block that has multiple neighboring blocks with UR motion vector reference, if the current block is inter coded and two or more neighboring blocks to the current block use a UR motion vector for inter prediction. As another example, if a block with non-UR reference is surrounded by blocks with UR references on two or more sides, this may indicate that the block is to be used for updating a portion of UR frame. As another example, if a current block is intra coded and a plurality of neighboring blocks use UR frame as reference and have a motion vector of (0,0) (e.g., a zero motion vector), the current block may be identified as a block to be used for updating a portion of UR frame. As yet another example, if a current block is intra coded and a plurality of neighboring blocks use UR frame as reference and have the same or similar motion vector (e.g., the motion vector can differed by less than a predetermined or a predefined amount), the current block may be identified as a block to be used in updating UR frame.

As another example, and further referring to FIG. 7, in some implementations, a block may include a coding unit (CU) and a condition for determination may include a condition specifying that if neighboring CUs on at least three sides all use UR reference, all blocks of the current CU may be selected. As another example, in some implementations, the block can include a coding tree unit (CTU) level and the condition can include that if neighboring CTUs on at least three sides all use UR reference, all blocks of the current CTU that do not use UR reference may be selected as blocks used to update UR frame.

At 730, a selected block may be encoded and included in a bitstream. Encoding may include utilizing inter prediction and intra prediction modes, for example. In some implementations, explicit UR frame block update parameters may not be included in a bitstream for a current block.

Figure 8:
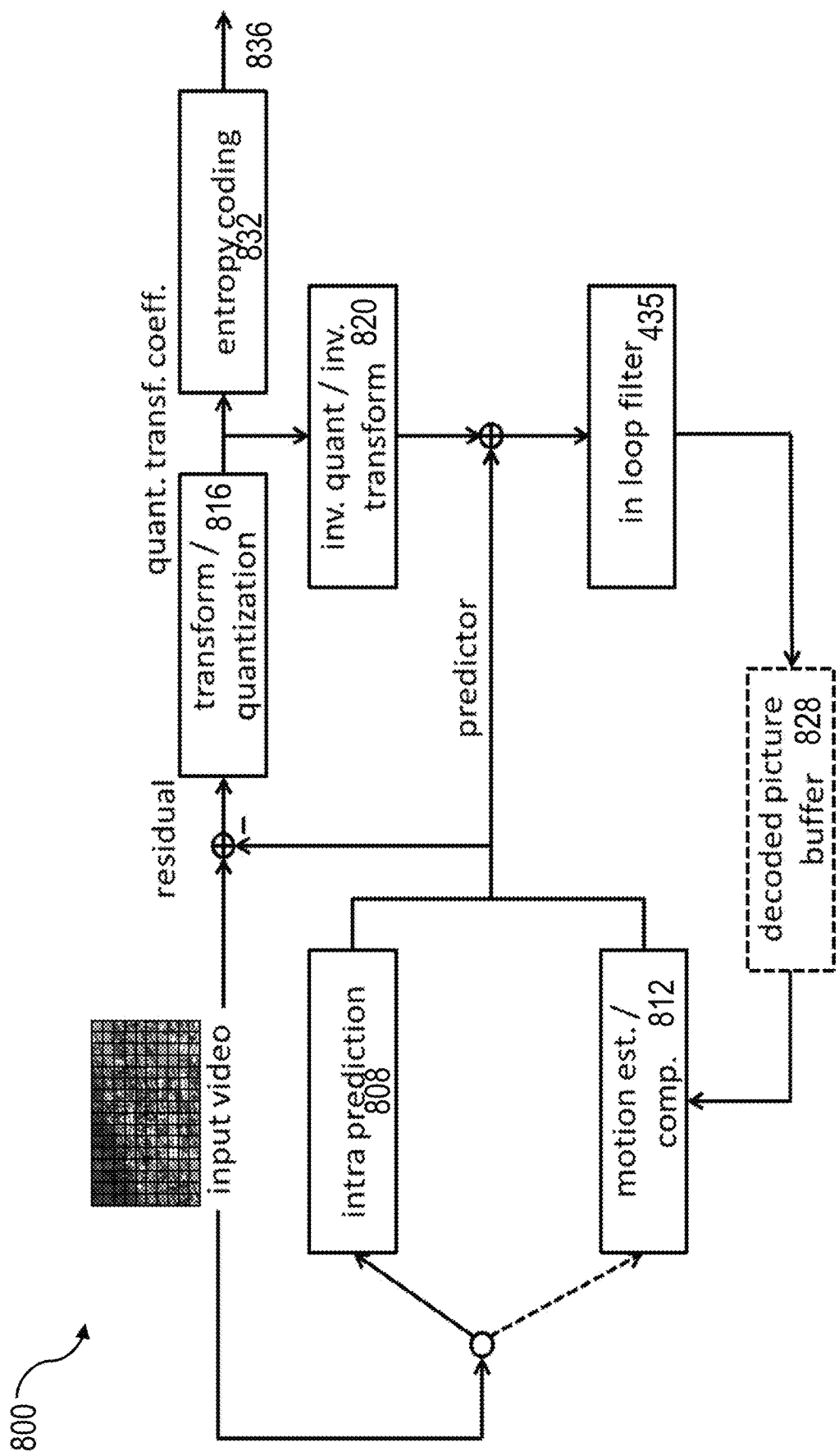
FIG. 8 is a system block diagram illustrating an example video encoder capable of signaling for decoder side UR block updates.

FIG. 8 is a system block diagram illustrating an exemplary embodiment of a video encoder 800 capable of explicit and/or implicit signaling for decoder side UR block updates. Example video encoder 800 receives an input video 804, which may be initially segmented or divided according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU); a result of this portioning may include a group of sub-blocks that may be called predictive units (PU). Transform units (TU) may also be utilized. A "transform unit," as used in this disclosure, is a basic unit at which the frequency transformation is applied, which may include without limitation a sub-block of CU that is suitable for frequency transform operations. As a non-limiting example, a TU may include a transform block of luma samples and two corresponding transform blocks of chroma samples of a picture and syntax structures used to transform the transform block samples, where a "transform block" is defined as a rectangular M×N block of samples resulting from a transform in a decoding process Still referring to FIG. 8, example video encoder 800 includes an intra prediction processor 815, a motion estimation/compensation processor 812 (also referred to as an inter prediction processor) capable of supporting explicit and/or implicit UR frame block updates at the decoder, a transform/quantization processor 816, an inverse quantization/inverse transform processor 820, an in-loop filter 824, a decoded picture buffer 828, and an entropy coding processor 832. In some implementations, motion estimation/compensation processor 812 may determine for a current block that a UR frame should be updated at decoder, for instance, according to one or more of the conditions described above with respect to FIGS. 6 and/or 7; motion estimation/compensation processor 812 may set parameters to explicitly signal that a UR frame block update mode is enabled. Bit stream parameters that signal UR frame block update modes may be input to the entropy coding processor 832 for inclusion in the output bit stream 836. Alternatively or additionally, motion estimation/compensation processor 812 may update encoder UR frame with a current block and no explicit UR frame block update signaling may be included in bit stream. Bit stream parameters may be input to entropy coding processor 832 for inclusion in the output bit stream 836. A portion of an encoder side UR frame may be updated for use by motion estimation/compensation processor 812 for encoding additional blocks that can utilize UR frame as a reference for inter prediction.

In operation, and continuing to refer to FIG. 8, for each block of a frame of input video 804, whether to process the block via intra picture prediction or using motion estimation/compensation may be determined. Block may be provided to intra prediction processor 808 or motion estimation/compensation processor 812. If block is to be processed via intra prediction, intra prediction processor 808 may perform processing to output a predictor. If block is to be processed via motion estimation/compensation, the motion estimation/compensation processor 812 may perform processing including using an encoder side UR frame as a reference for inter prediction, if applicable.

Still referring to FIG. 8, a residual may be formed by subtracting a predictor from input video. Residual may be received by transform/quantization processor 816, which may perform transformation processing (e.g., discrete cosine transform (DCT)) to produce coefficients, which may be quantized. Quantized coefficients and any associated signaling information may be provided to entropy coding processor 832 for entropy encoding and inclusion in output bit stream 836. Entropy encoding processor 832 may support encoding of signaling information related to UR frame block update modes. In addition, quantized coefficients may be provided to inverse quantization/inverse transformation processor 820, which may reproduce pixels, which may be combined with predictor and processed by in loop filter 824, an output of which may be stored in a decoded picture buffer 828 for use by motion estimation/compensation processor 812 that is capable of supporting UR frame block updates at a decoder.

Although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control risk of false prediction. In some implementations, UR frame block update mode may be available as an additional option available at every leaf node of the QTBT. A current decoded block, as described above, may be included in a QTBT; for instance, and without limitation, current decoded block may be a non-leaf node of a QTBT.

In some implementations, additional syntax elements can be signaled at different hierarchy levels of the bitstream. UR frame block update, which may include without limitation an explicit UR frame block update and/or an implicit UR frame block update, may be enabled for an entire sequence by including an enable flag coded in a Sequence Parameter Set (SPS). Further, a CTU flag can be coded at the coding tree unit (CTU) level to indicate, whether any coding units (CU) use UR frame block update mode. A CU flag can be coded to indicate whether the current coding unit utilizes UR frame block update mode. A CTU flag may be coded at the coding tree unit (CTU) level to indicate whether any coding units (CU) use explicit UR frame block update signaling. A CTU flag may be coded at the coding tree unit (CTU) level to indicate whether any coding units (CU) use implicit UR frame block update signaling. Although the above-disclosed embodiments have been described regarding updates to UR frames, the above-disclosed embodiments may alternatively or additionally be applied to other frames, pictures, including without limitation long-term reference frames.

The subject matter described herein provides many technical advantages. For example, some implementations of the current subject matter may provide for decoding blocks using a UR frame that may include updating portions of the UR frame without having to update the entire UR frame. Such approaches may reduce complexity while increasing compression efficiency. Moreover, where implicitly signaling UR block updates, header overhead may be reduced, thereby reducing bit rate and improving compression.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
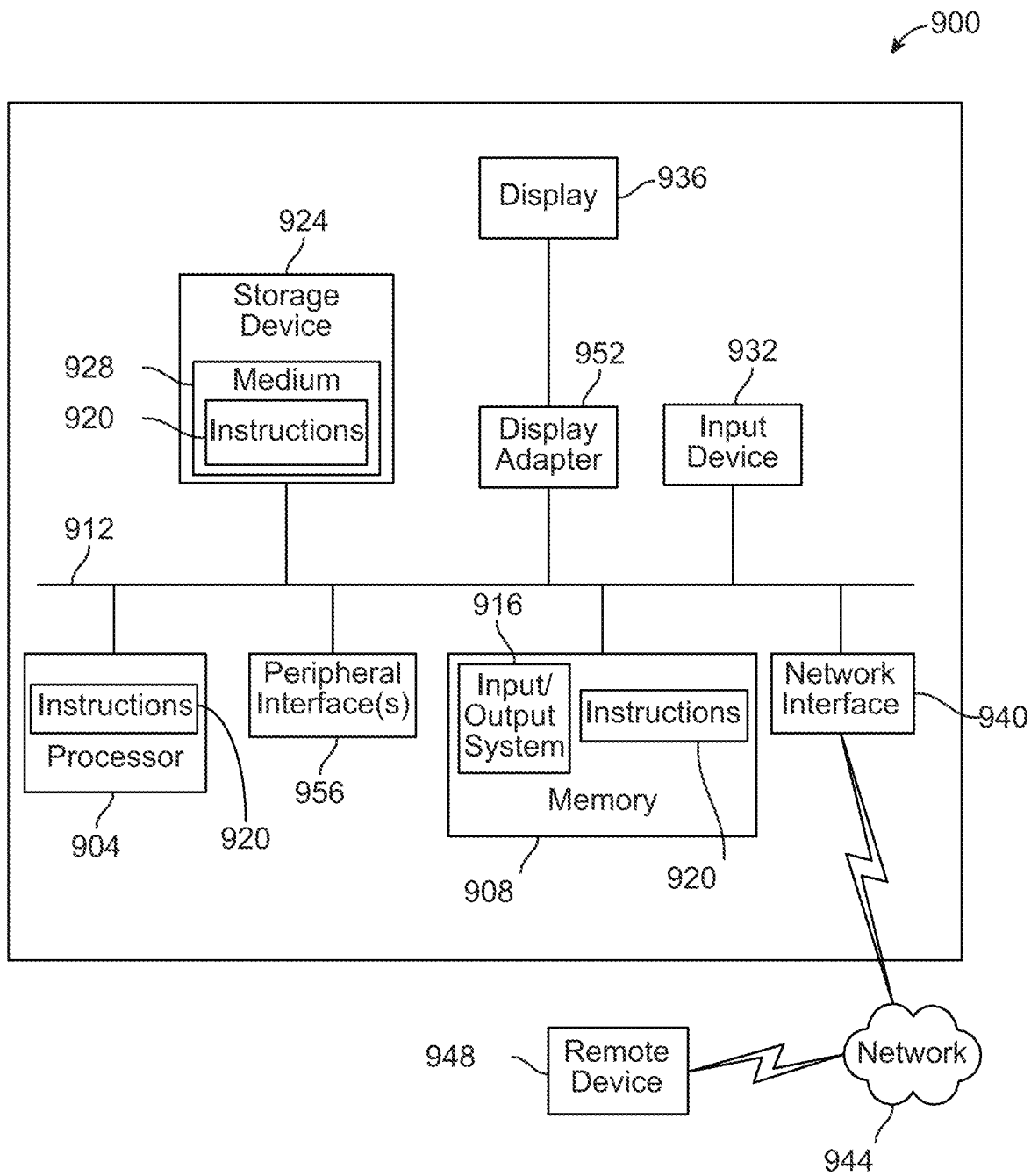
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE®), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide non-volatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE® interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE® connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A decoder configured to:
receive a bitstream generated by an encoder and comprising signaling information and a first coded picture to be used as a reference picture and a second coded picture, the second coded picture comprising a first block and a second block, the signaling information including a sequence parameter set (SPS) indicating that a mode is enabled in which a portion of a reference picture can be modified;
decode and store the first picture as a reference picture;
using the mode, modify a portion of the reference picture solely in response to information generated by the encoder and included in the bitstream;
utilize the modified portion of the reference picture as a predictor for the first block of the second picture;
decode the first block by adding residual pixels to the predictor; and
decode the second block of the second picture without using a modified portion of any reference picture.

2. The decoder of claim 1 wherein the first block and the second block are N×N coding units.

3. The decoder of claim 1 wherein the second block of the second picture is an intra-coded block.

* * * * *